United States Patent [19]

Miller, III

[11] 3,743,794

[45] July 3, 1973

[54] TRANSLATIONAL MOTION APPARATUS FOR THE MAGNETIC TRANSDUCERS OF A DISC MEMORY

[75] Inventor: John H. Miller, III, Milpitas, Calif.

[73] Assignee: Hewlett-Packard Company, Palo Alto, Calif.

[22] Filed: Mar. 2, 1972

[21] Appl. No.: 231,319

[52] U.S. Cl.................. 179/100.2 CA, 340/174.1 C
[51] Int. Cl. ............................................. G11b 5/54
[58] Field of Search............ 179/100.2 CA, 100.2 P; 340/174.1 E, 174.1 C

[56] References Cited
UNITED STATES PATENTS 3,646,536  12/1969  Bleiman ................... 179/100.2 CA
3,544,980  12/1970  Applequist ................ 179/100.2 CA Primary Examiner—Vincent P. Canney
Attorney—A. C. Smith

[57] ABSTRACT

An improved linear motor includes a motion transducer disposed within the core section of the magnetic circuit for the shuttle of the linear motor to provide a velocity output signal substantially unaffected by magnetic fields and eddy currents associated with current in the linear motor coil. The positional adjustment of the magnetic transducers carried by the shuttle of the linear motor is facilitated by the cam action of an adjustment tool which fits within a recess in the shuttle and engages a transverse slot within the support for the magnetic transducer.

3 Claims, 5 Drawing Figures

Patented July 3, 1973 3,743,794

Patented July 3, 1973 3,743,794

TRANSLATIONAL MOTION APPARATUS FOR THE MAGNETIC TRANSDUCERS OF A DISC MEMORY

BACKGROUND AND SUMMARY OF THE INVENTION

Certain known linear actuators for radially positioning the magnetic transducers of a disc memory include a velocity transducer centrally disposed within the shuttle and protruding beyond the ends of the core. Because the fringing magnetic fields present around the ends of the core structure and the eddy currents within the core structure produced by the current in the linear actuator coil are coupled to the transducers, the resultant velocity signal produced thereby is nonlinear over the range of shuttle positions. A pair of velocity transducers, each suffering the same effects of fringing magnetic fields and eddy currents, are commonly used in side-by-side location and in opposing connection to cancel out the nonlinearities caused by the fringing fields. However, this increases the moving mass coupled to the shuttle and also reduces the quantity of magnetic material in the central core region about the velocity transducers.

These disadvantages of the prior art techniques are overcome in the present invention which uses an improved velocity transducer that is shorter than the core section and that is adequately shielded from the effects of fringing fields. In addition, the shuttle includes adjustment means for altering the static position of the magnetic transducer on the disc memory for a given translational position of the linear motor.

DESCRIPTION OF THE PREFERRED EMBODIMENT

Figure 1:
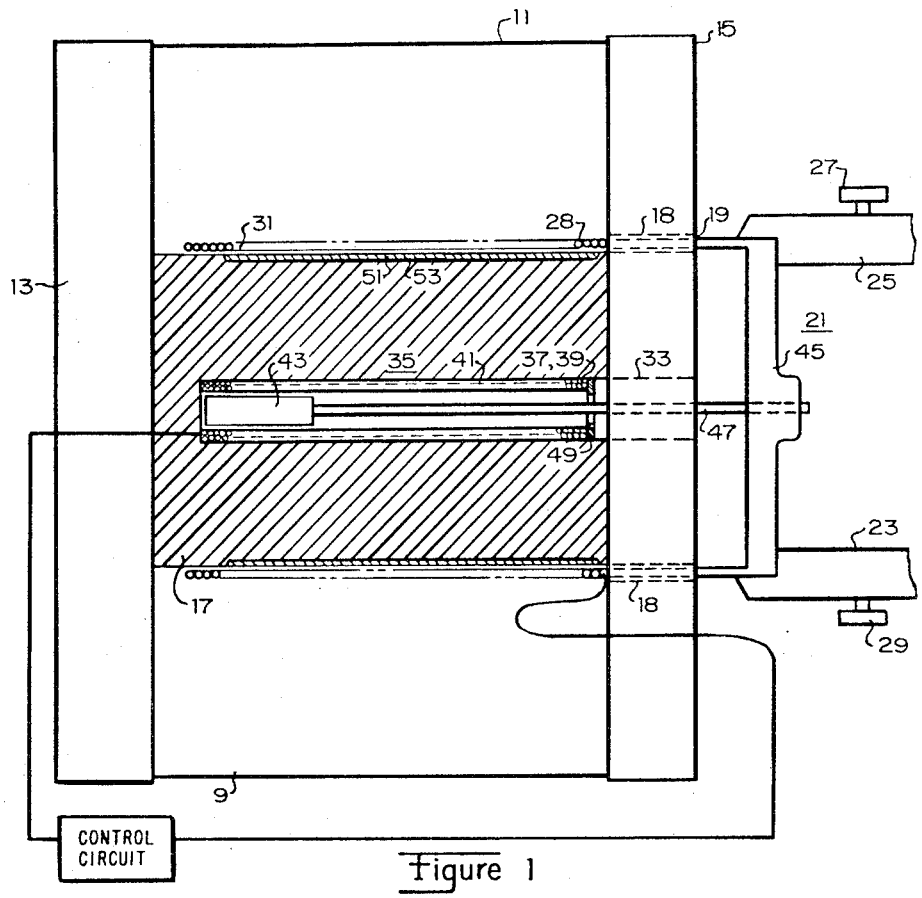
FIG. 1 is a sectional view of the linear motor of the present invention.

Referring now to FIG. 1 there is shown a magnetic structure which includes a pair of magnets 9, 11 spaced side by side between end plates 13, 15 with a cylindrical core 17 attached to the rear end plate 13 and protruding through an aperture 18 in the front plate 15. The radial spacing between the core 17 and the aperture 18 forms an air gap 19 in the magnetic circuit across which a radial field is produced. Shuttle 21 includes a pair of laterally spaced support members 23, 25 which support the shuttle on rails (not shown) for movement in a longitudinal direction. The shuttle 21 includes a coiled conductor 28 which is helically wound on a nonconductive thin-walled portion 31 of the shuttle 21 to form an electromagnet for interaction with the radial field in the air gap 19.

Disposed within the axial bore 33 of the cylindrical core section 17 is a velocity transducer 35 which includes a pair of windings 37, 39 disposed about a hollow stainless steel bobbin 41. A cylindrical magnet 43 which serves as a source of magnetic field is mounted within the hollow bobbin 41 for translational movement therewithin in response to movement of the shuttle 21. The magnet 43 is rigidly coupled to the shuttle 21 near a central location on the front plate 45 of the shuttle by a coupling rod 47. A magnetic shunt 49 of soft iron and having an aperture therethrough for the coupling rod 47 is disposed within the axial bore 33 in the cylindrical core 17 adjacent the end of the windings 37, 39. This shunt assures that stray magnetic fields associated with the current in the coiled conductor 28 of the linear motor are not coupled to the windings 37, 39. Also, the surrounding magnetic material of the core 17 serves as the flux return path for the magnet 43.

Figure 2:
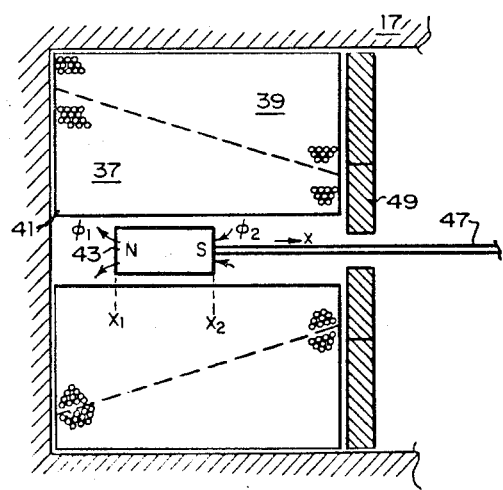
FIG. 2 is a sectional view of the velocity transducer of FIG. 1.

As shown in FIG. 2, this transducer includes a bobbin 41 on which is wound a set of tapered windings 37, 39. The density of these windings (i.e., the number of turns of the winding per unit length of the bobbin) varies substantially linearly in opposite directions from opposite ends of the bobbin 41. The source 43 of magnetic flux may be attached securely to coupling rod 47 using a suitable potting compound such as Teflon-loaded Delrin cast about both the magnet 43 and the coupling rod 47. This enhances the slidable movement of the magnet source 43 within the bobbon 41 (formed, for example, of stainless steel) without the aid of lubricants and without producing wear particles. The thin-walled bobbin 41 of stainless steel conducts eddy currents due to the movement of magnet 43 but provides a superior bearing surface for the slidable magnet 43.

It can be shown that the voltage generated by each of the coils 37, 39 in response to movement of the magnet 43 is a function of the rate of change of position of the magnet 43, its flux and the number of turns of the coil 37, 39 intercepted by the changing flux. Thus, for a given coil, the voltage is as follows:

$$e_1 = \Phi \cdot dN_1/dt \tag{1}$$

where $\Phi$ is the flux from magnet 43 (constant) and N is the number of turns.

For a tapered coil:

$$e_1 = \Phi \, dN_1/dx \cdot dx/dt \tag{2}$$

where Velocity is $dx/dt$.

But, for a linearly-tapered winding:

$$dN_1/dx = Kx_1 \tag{3}$$

Thus, the voltage for each of the coils is:

$$e_1 = \Phi \, Kx_1 V; \text{ and} \tag{4}$$

$$e_2 = \Phi \, Kx_2 V \tag{5}$$

The coils 37, 39 are connected in series-opposing configuration and the output voltage thus is:

$$E_{out} = KV\Phi(x_1 - x_2) \tag{6}$$

Since $(x_1 - x_2)$ is the length ($Lm$) of the magnet 43, the output is:

$$E_{out} = 2KV\Phi Lm \tag{7}$$

This analysis assumes that the length ($Lm$) of the magnet 43 is short and disposed entirely within the length of the bobbin 41 for all movements of the magnet 43 in response to translational movement of the shuttle 21.

The coils 37, 39 may be wound simultaneously from opposite ends of the bobbin using a pair of wire guides which are moved along the length of the bobbin 41 from the opposite ends at the rate which is suitable for establishing the linear taper of the winding density with length along the length of bobbin 41. It should be noted that the usable stroke length is $L - Lm$. Since $Lm$ is not a function of the coil length ($L$), the ratio of stroke to the length of the bobbin 41 can approach unity. Thus, for a transducer of over-all length of approximately 4 ½ inches and a magnet 43 of approximately 1-inch length, the usable stroke length is approximately 3 inches.

In operation of the linear motor of the present invention, a signal is applied to the coiled conductor 28 through flexible connections (not shown) to establish an electromagnetic field about the conductor which interacts with the radial permanent magnetic field within the air gap 19 to produce lineal movement of the coiled conductor 28 and of the shuttle 21 that is attached thereto. The shuttle 21 carries with it the cylindrical magnet 43 within the bobbin of transducer 35 to produce in the windings 37, 39 of the transducer an electrical signal which is indicative of the direction and velocity of the shuttle 21. These signals, together with suitable digital means (not shown) for indicating position of the shuttle 21 along its lineal path of movement, are used to control the movement of the shuttle in a conventional manner. Also, in order to maintain the inductance of the coiled conductor 28 substantially constant over the linear travel of the shuttle 21, a shorted conductor 51 is disposed on the cylindrical surface of the core section 17. This shorted conductor 51 is molecularly deposited copper (plated or sputtered into place) which is overformed in a cylindrical recess 53 and which is subsequently machined to provide a substantially uniform cylindrical core 17. The core 17 and end plates may then be plated with a suitable anti-corrosion material such as nickel. Thus, when the shuttle 21 is located near its minimally extended position, the inductance of the coiled conductor 28 is decreased by the shorted conductor 51 which reduces the effect of the core 17 on the inductance of the coiled conductor 28. Also, in order to insure accurate indication of the velocity of the shuttle 21, the transducer 35 is disposed well within the cylindrical core 17 in order to avoid the effects of stray magnetic fields and eddy currents due to current in the coil 28 which tend to destroy the linearity of electrical indication of the velocity of the magnet 43.

Figure 3:
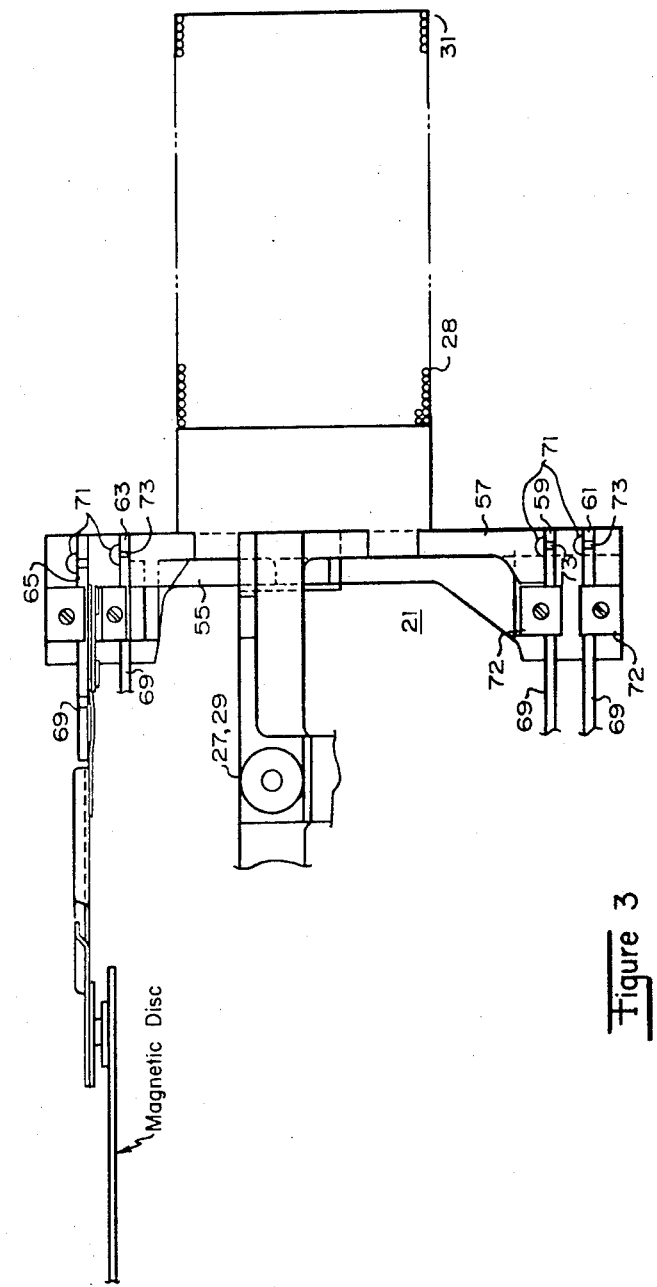
FIG. 3 is a side view of the shuttle of the motor of FIG. 1.
Figure 4:
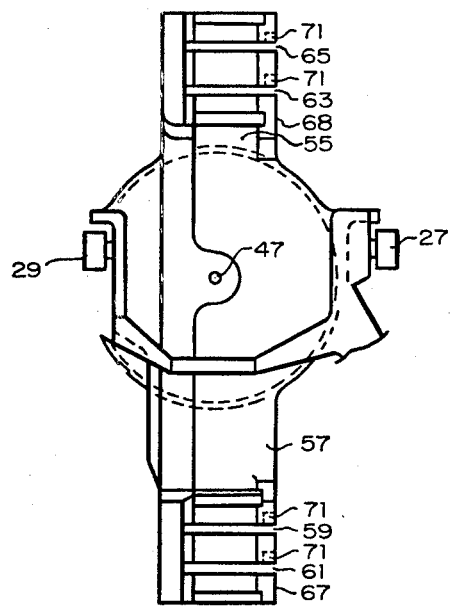
FIG. 4 is an end view of the shuttle of FIG. 3.
Figure 5:
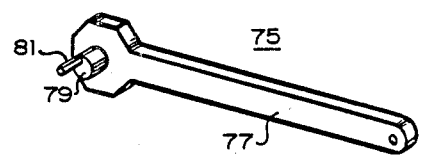
FIG. 5 is a perspective view of the adjustment tool for the shuttle of FIG. 3.

Referring now to FIGS. 3 and 4, the shuttle 21 includes a pair of vertically spaced support arms which are arranged to support a pair of magnetic transducers (not shown) with respect to the surfaces of a disc memory unit. Each of these lateral extensions 55, 57 includes a pair of substantially horizontally oriented slots 59, 61, 63 and 65 which communicate with one side face 67, 68 of the lateral extensions 55, 57. These slots are substantially parallel aligned with the axis of movement of the shuttle 21 and are arranged to hold therein a support member 69 for a magnetic data signal transducer (not shown). In order to provide proper axial positioning of such magnetic transducers for a given position of the shuttle 21, it is necessary to adjust the axial positions of the support members 69 within the corresponding slots 59–65. For this purpose, a recess 71 is formed in each of the faces 67, 68 of the lateral extensions adjacent the corresponding slots 59–65 to form a substantially semicircular recess that communicates with the slot in the face 67, 68. Each of the support members 69 includes a transverse slot 73 on an edge thereof which communicates with the face 67, 68 of each of the lateral extensions 55, 57. The recesses 71 and the transverse slots 73 in each of the supports 69 thus furnish camming surfaces for movement of the support members 69 within the corresponding slots 59–65. An adjustmemt tool, as shown in FIG. 5, may thus be conveniently disposed within the recess 71 and transverse slot 73 to effect translational adjustments of the support members 69 within the slots 59–65. This adjustment tool 75 includes a body portion having a lever arm 77 and a protruding boss 79 which is arranged to seat within the recess 71. A protruding pin 81 located eccentric the rotational center of the boss 79 within the recess 71 thus engages the transverse slot 73 within a support 69 such that rotational movement of the lever arm 77 produces translational movement of the support member 69 within the corresponding slot 59–65. Once the adjustment is properly made, a clamping plate 72 for each support member 69 may be tightened into place to laterally squeeze the support member 69 firmly within the slot 59–65.

I claim:

1. Linear positioning apparatus for a magnetic transducer of a magnetic disc storage device which has a substantially planar recording surface thereon, the apparatus comprising:

shuttle means mounted for lineal movement along a path which is substantially normal to and radially aligned with the rotational axis of a magnetic disc storage device;

a mounting surface carried by said shuttle means which is substantially plane-parallel to the recording surface of the magnetic disc storage device;

a mounting member slidably supported with respect to said mounting surface for lineal movement of the mounting member in a direction aligned with said path of movement of the shuttle means, the mounting member having a first cam surface at a location along an edge thereof in the region of the mounting surface and being disposed to support a magnetic transducer with respect to the recording surface of a magnetic disc storage device;

a second cam surface carried by said shuttle means adjacent the mounting surface in the region of the first cam surface for providing with the first cam surface a set of leverage points by which a lever may exert force on the mounting member in a direction aligned with said path of movement for altering the position of said mounting member relative to said shuttle means.

2. Linear positioning apparatus as in claim 1 wherein said first cam surface is a recessed slot in an edge of the mounting member that is adjacent the second cam surface and that is oriented substantially normal to said direction;

said second cam surface includes a recess in said shuttle means adjacent the first cam surface for receiving a protrusion in rotatable engagement therewithin; and adjustment means including an elongated element having a protrusion thereon located near an end thereof for selectively engaging the second cam surface for rotation therewithin, said adjustmemt means including an element which is located eccentric the axis of rotation of said protrusion in said second cam surface and which is disposed selectively to engage said first cam surface for urging said mounting member relative to said shuttle means in a direction aligned with said path of movement in response to rotation of said adjustment means.

3. Linear positioning apparatus as in claim 1 comprising clamping means disposed with respect to said shuttle means and said mounting member for selectively retaining said mounting member in adjusted position on said mounting surface.

* * * * *